Figure 3:
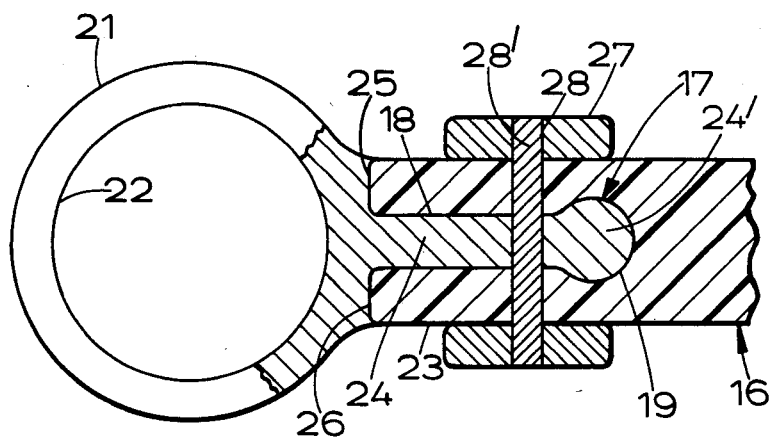

United States Patent [19]

Ward

[11] Patent Number: 4,562,998
[45] Date of Patent: Jan. 7, 1986

[54] LEAF SPRING ASSEMBLIES

[75] Inventor: Terence H. Ward, Walsall, England

[73] Assignee: Rubery Owen Holdings Limited, Walsall, England

[21] Appl. No.: 485,852

[22] Filed: Apr. 18, 1983

[30] Foreign Application Priority Data

Apr. 23, 1982 [GB] United Kingdom ............... 8211754

[51] Int. Cl.$^4$ .......................... F16F 1/18; F16F 1/36
[52] U.S. Cl. .................... 267/54 R; 267/148
[58] Field of Search ............. 267/36 R, 40, 47, 54 R, 267/53, 54 B, 148, 149, 158, 32; 403/373, 386

[56] References Cited

U.S. PATENT DOCUMENTS

| | | | |
|---|---|---|---|
| 620,834 | 3/1899 | Belcher et al. | 403/373 X |
| 1,419,083 | 6/1922 | Sturt | 267/54 R X |
| 1,436,387 | 11/1922 | Edelen | 267/54 R |
| 1,544,169 | 6/1925 | Orwig | 267/53 X |
| 1,643,232 | 9/1927 | Andren | 267/54 R |
| 1,725,266 | 8/1929 | Gump | 267/53 X |
| 1,814,682 | 7/1931 | Frost | 267/47 |
| 1,852,132 | 4/1932 | Sieprath | 267/53 X |
| 1,941,331 | 12/1933 | Veale | 267/54 R |
| 2,204,940 | 6/1940 | Mainard | 267/47 |
| 2,670,950 | 3/1954 | Keysor | 267/53 |
| 4,411,159 | 10/1983 | Spear et al. | 267/47 X |

FOREIGN PATENT DOCUMENTS

| | | | |
|---|---|---|---|
| 0313897 | 6/1934 | Italy | 267/54 R |
| 0086934 | 7/1980 | Japan | 267/47 |
| 0474995 | 11/1937 | United Kingdom | 267/47 |
| 1192532 | 5/1970 | United Kingdom | 267/53 |
| 2021731 | 12/1979 | United Kingdom | 267/149 |

*Primary Examiner*—Bruce H. Stoner, Jr.
*Assistant Examiner*—Robert J. Oberleitner
*Attorney, Agent, or Firm*—Scrivener, Clarke, Scrivener & Johnson

[57] ABSTRACT

A spring leaf of composite fibre reinforced synthetic resin material has an attachment member secured at an end thereof by means of a clamping band which fits about the end of the spring leaf and an extension portion of the attachment member to clamp them together. In one form the attachment member is an eye-end with opposed flanges which lie on the spring leaf and each of which is clamped to the leaf by a clamping band secured by a pin. In an assembly having two superimposed spring leaves one clamping band has a depending portion in which the end of the lower leaf is slidingly located. In another form the attachment member is an eye with a tang having an enlarged end which is received into a complementary recess in the end of the spring leaf and retained therein by the clamping band.

5 Claims, 9 Drawing Figures

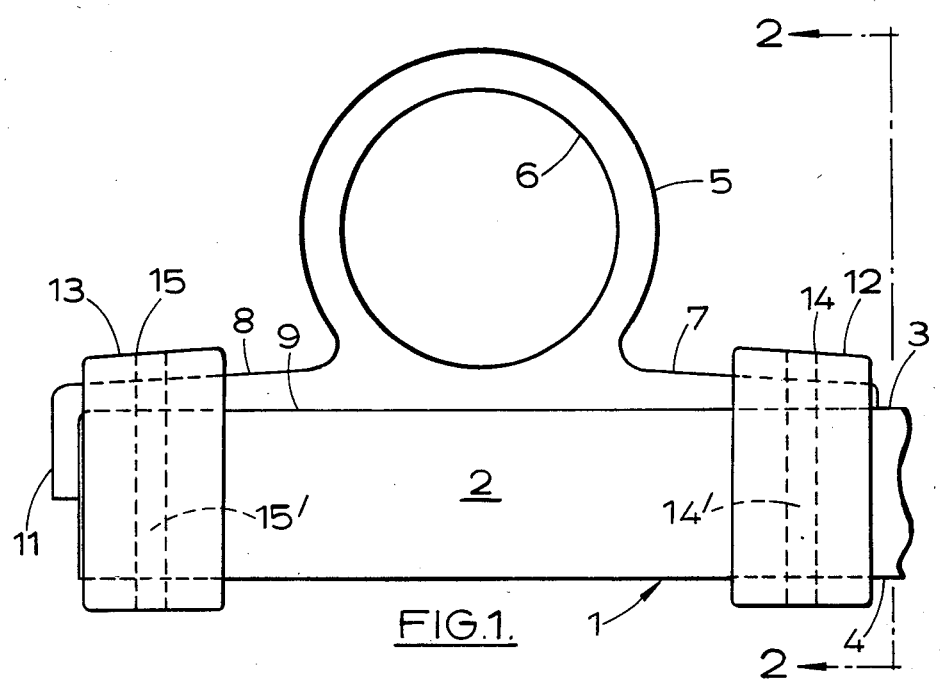
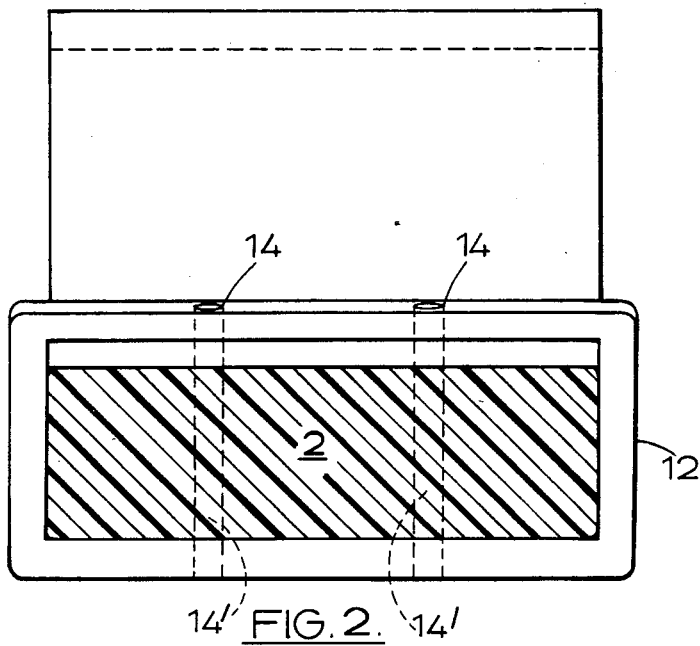

LEAF SPRING ASSEMBLIES

SPECIFIC DESCRIPTION

This invention relates to leaf spring assemblies of the kind comprising a spring leaf made from a composite fibre reinforced synthetic resin material, and is more particularly concerned with the provision and securing of an attachment member to such a spring leaf whereby it may be attached to a component or structure for use.

Such spring leaves are provided with fibres, for example of carbon or of glass, which are orientated longitudinally of the spring leaves at least in the region of the upper and lower surfaces of the leaves. They may also have fibres having a transverse or even a random orientation. If the longitudinal fibres are interrupted or broken, for example by drilling of bolt holes for securing attachment members to the spring leaves, the consequent weakening of the leaves can lead to early failure due to shear in the region of the bolt holes. It is therefore desirable to minimise any interruption of the longitudinal fibres and any shear loads applied to the spring at such interruptions.

The present invention consists in a leaf spring assembly comprising a spring leaf of composite fibre reinforced synthetic resin material having opposed upper and lower substantially planar surfaces at an end portion thereof and an attachment member secured thereto by at least one band which clamps an extension portion of the attachment member and the end of the spring leaf together in intimate engagement.

The attachment member may be an eye-end. The extension portion may comprise a tang, flange or the like. It is necessary for the extension portion to be of sufficient size to provide adequate support for the spring leaf to which the attachment member is secured.

The band may be a one-piece clamping ring. After fitting of the band it may be secured to the leaf, for example by one or more pins or screws.

One or both of the clamping bands and extension portions of the attachment member may have an inclined surface or surfaces complementary to the inclined surfaces of the extension protions of the eye-end so as to facilitate intimate clamping engagement of the band or bands with the extension portions in the assembly. The angle of the inclination is desirably between 4° and 6°, preferably between 4½° and 5½°. This angle of inclination has been found to be such as to enable adequate support to be provided at the end of the spring leaf. A steeper angle increases the size and weight of the attachment member beyond what is otherwise necessary. A smaller angle presents difficulties in ensuring that when the attachment member is an eye-end the clamping band does not approach the eye too closely, detracting from the support provided by the extension portion and making it difficult to drill through the extension portion and leaf for securing the clamping band by pins or screws.

The end portion of the spring leaf may be recessed or grooved to receive the extension portion of the eye-end. Means may be provided on the attachment member adapted to locate the member relative to the leaf before clamping.

The assembly may contain superimposed spring leaves of composite fibre reinforced synthetic resin material. In such an assembly containing two spring leaves the attachment member may be secured to the upper leaf and the clamping band may include a support ring in which an end portion of the lower leaf is movable so as to retain location of a load applying member, for example a vehicle axle, which is connected to the leaf spring assembly, in the event of a transverse failure of the upper leaf.

Using a band to retain the attachment member to the spring leaf enables a small diameter pin or screw to be used to secure the assembly, thus minimising the deleterious effect on the strength of the spring leaf of piercing it.

Figure 4:
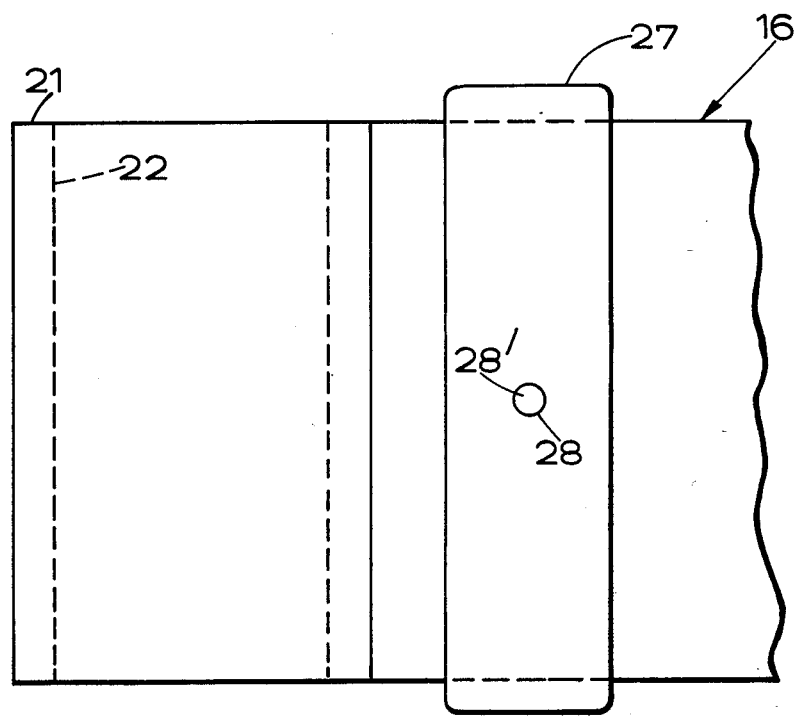
Figure 5:
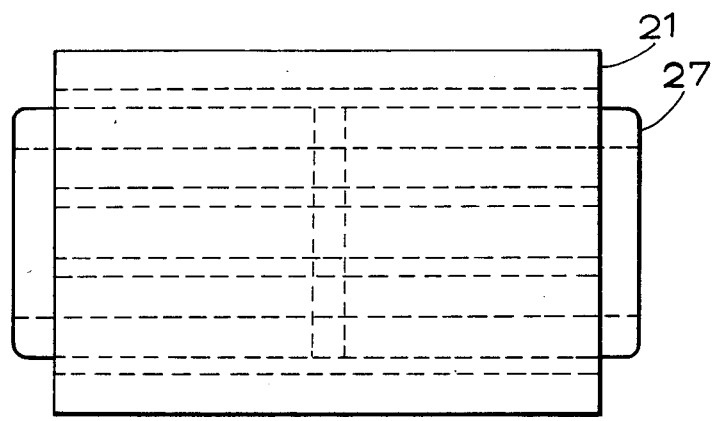
Figure 7:
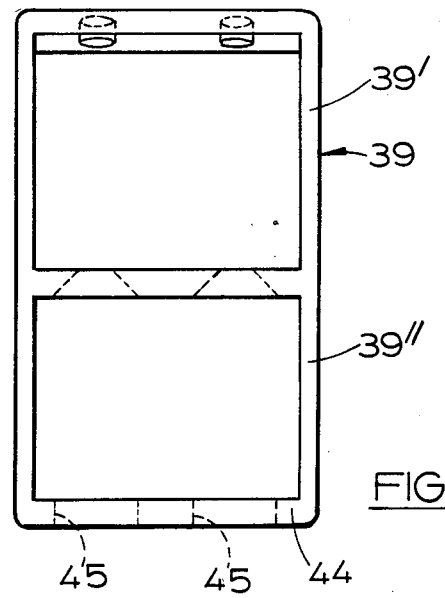
Figure 6:
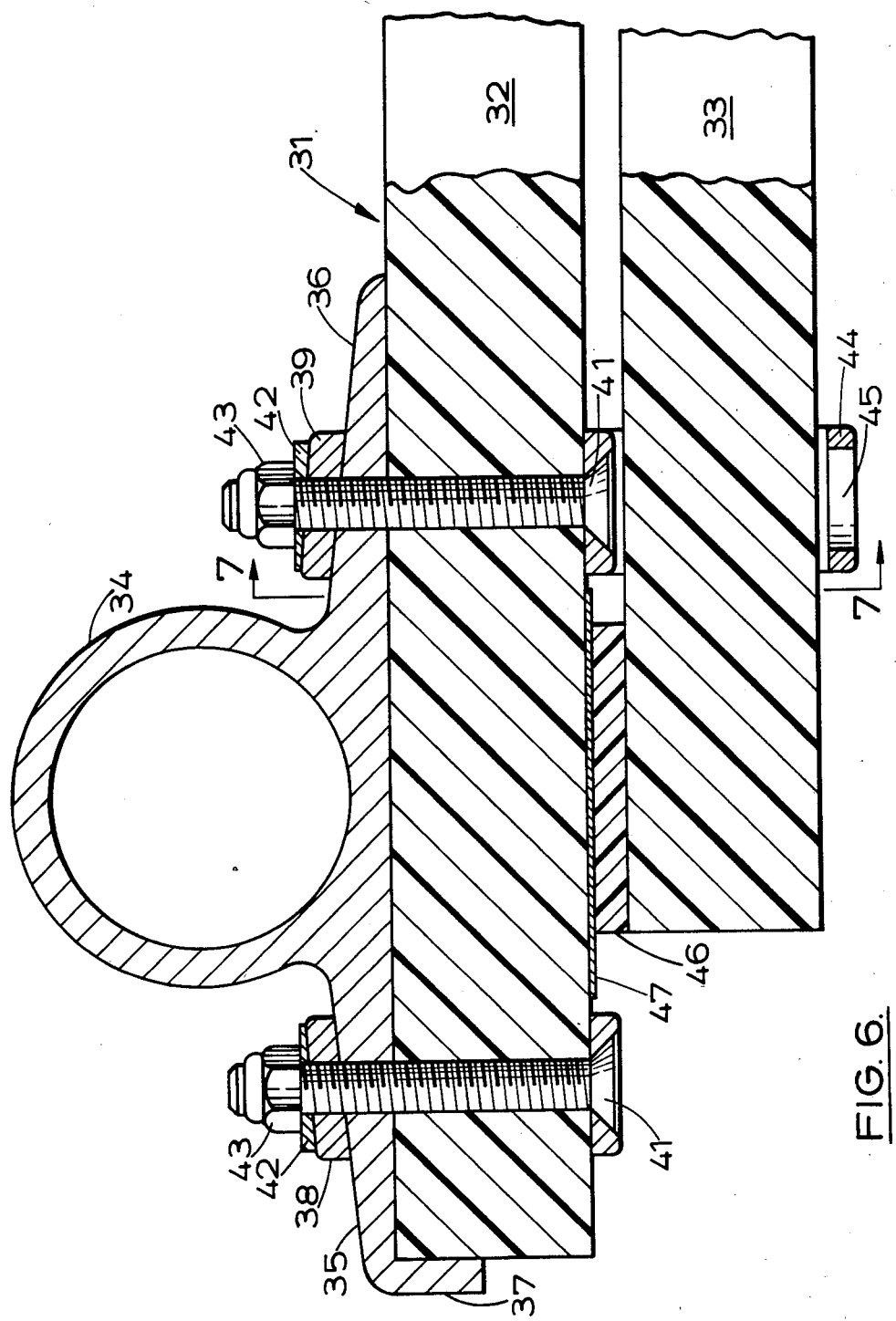
Figure 9:
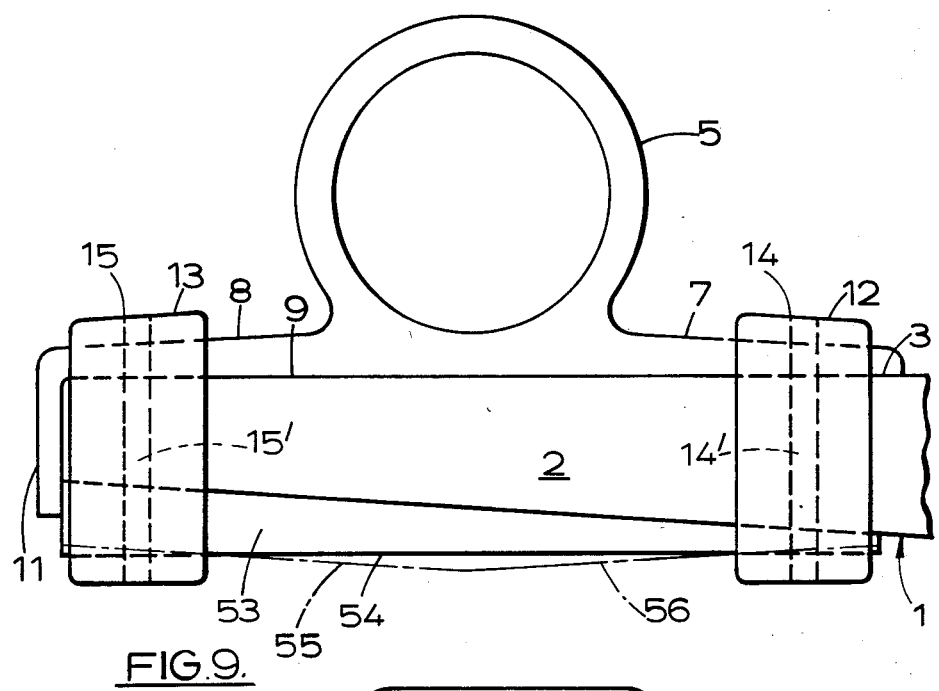
Figure 8:
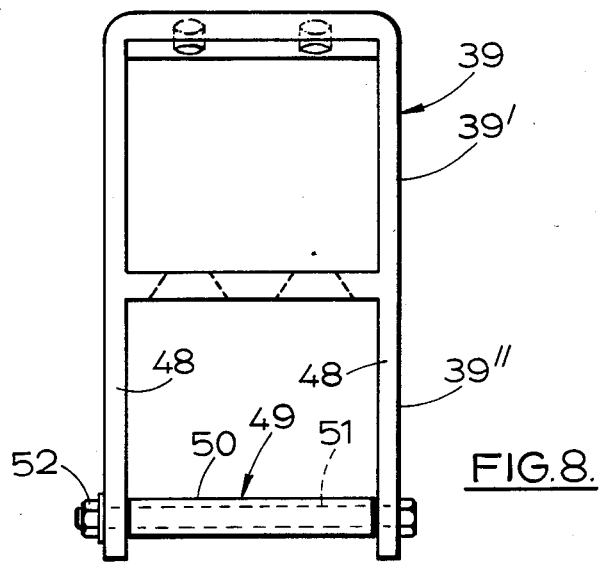

Embodiments of the invention will now be described by way of example with reference to the accompanying drawings in which:

FIG. 1 is a side elevation of one end of a leaf spring assembly according to the invention, FIG. 2 is an end elevation on line 2—2 of FIG. 1, FIG. 3 is a side elevation, partly in section, of one end of a further leaf spring assembly according to the invention, FIG. 4 is a plan view of the assembly of FIG. 3, FIG. 5 is an end elevation of the assembly of FIG. 3, FIG. 6 is a side elevation of one end of an assembly including a two leaf spring, FIG. 7 is a view in the direction of arrows 7—7 of FIG. 6 of a band, FIG. 8 shows a modified form of the band shown in FIG. 7, and FIG. 9 is a side elevation similar to that of FIG. 1 showing a modified assembly.

Referring to FIGS. 1 and 2, a spring leaf 1 of composite reinforced synthetic resin material constructed in a known manner has an end portion 2 of rectangular cross-section having upper and lower surfaces 3, 4 which are flat and parallel to one another. An attachment member comprising an eye-end 5 having an eye 6 adapted to receive a bolt or pin, not shown, for securing the end portion 2 of the leaf to a component or structure for use, for example a spring hanger bracket on a vehicle.

The eye-end 5 also has two extension portions in the form of flanges 7, 8 integral with the eye 6. Upper surfaces of which are similarly inclined downwardly at a shallow angle towards their free ends, as seen in FIG. 1. A lower surface 9 of the eye-end is flat and the flange 8 has a depending extension 11.

Clamping bands 12, 13 in the form of endless rings have machined inner surfaces within which the end portion 2 of the leaf is snugly received and have through drillings 14, 15 to receive pins 14', 15' respectively for locking the eye-end on the end portion of the leaf. An inner upper surface of each clamping band 12, 13 has an inclination corresponding to that of the inclined upper surface of each of the flanges 7, 8.

In the constructing of the leaf spring assembly one clamping band ring 12 is slid on to the spring leaf 1 and the eye-end 5 is positioned on the upper surface of the leaf with the extension 11 abutting the end face of the leaf. The other clamping band 13 is then applied over the end portion of the leaf and the one flange 8, and the other clamping band 12 is slid over the other flange 7. A load is applied between the clamping bands to draw them together and so clamp the eye-end 5 in intimate engagement with the spring leaf.

The pre-drilled holes 14, 15 in the clamping bands are used as guides for drilling registering holes through the flanges 7, 8 and the spring leaf 1, and the locking pins 14', 15' are driven in to secure the assembly.

The camming action of the engaging inclined surfaces of the flanges 7, 8 and clamping bands 12, 13 enables the required clamping load to be generated and over an adequate area, due to the length and width of the clamping bands, to ensure that the attachment member is firmly clamped on the spring leaf. The locking pins 14', 15' act as a safeguard to prevent any relaxation of this clamping load whilst minimising the number of fibres in the spring leaf which are severed.

Referring now to FIGS. 3, 4 and 5, a spring leaf 16 of composite reinforced synthetic resin material, also constructed in known manner, has an end portion 23 of rectangular cross-section with flat and parallel upper and lower surfaces and is formed with a recess 17 across the end portion. The recess 17 is symmetrical about the longitudinal centre line of the leaf and comprises a parallel-sided portion 18 leading to an enlarged portion 19 of generally circular section. The recess may be formed during moulding of the spring leaf or may be machined in the leaf after it has been moulded.

An attachment member, in this case an eye-end 21, has an eye 22 adapted to receive a bolt or pin, not shown, for securing the end portion 23 of the spring leaf 16 to a component or structure for use, for example a spring hanger bracket on a vehicle. The eye-end 21 has a tang 24 extending radially outwards from it being complementary to the recess 17 with an enlarged free end 24' complementary to the enlarged portion 19 of the recess. As the tang 24 and recess 17 are of complementary shapes the tang is received snugly into the recess. At the root of the tang 24 the eye-end 21 has aligned shoulders 25, 26 which abut against the end face of the leaf to locate the eye-end relative to the leaf.

A clamping band 27 in the form of a ring has its inner faces machined so as to fit snugly over the end portion 23 of the spring leaf 16 and has a hole 28 (or two spaced holes) drilled through it.

The leaf spring assembly is constructed by sliding the clamping band 27 over the end portion of the spring leaf 16. The tang 24 is entered into the recess 17 from one side of the leaf until the eye-end 21 is aligned with the leaf and located relative to it by abutment of the shoulders 25, 26 against the end face of the leaf. The tang 24 is slightly deeper than the recess 17 and in consequence the upper and lower surfaces of the leaf are sprung apart a small amount when the tang is inserted in the recess. The clamping band 27 is driven towards the eye-end thereby clamping the end portion of the leaf into intimate engagement with the tang. A hole is then drilled through the end portion of the leaf and the tang, in register with the hole 28 in the clamping band, and a pin 28' is driven in to secure the assembly.

Referring to FIG. 6, the assembly includes a composite spring 31, only one end of which is shown, having an upper leaf 32 and a lower leaf 33 each constructed in known manner of composite reinforced synthetic resin material. An attachment member comprises an eye-end 34, similar to that of FIG. 1, having extension portions in the form of flanges 35, 36 upper surfaces of which are inclined downwards towards their free ends. One of the flanges, 35, has a downwardly depending extension 37 which abuts the end face of the leaf 32. The eye-end 34 is located on the end portion of the upper leaf 32 by the extension 37 and is clamped by outer and inner clamping bands 38, 39 respectively, of endless ring form which have inner upper surfaces inclined similarly to the inclined upper surfaces of the flanges 35, 36. The clamping bands 38, 39 are secured by screws 41, tapered washers 42 and lock nuts 43.

It will be seen from FIG. 6 and more particularly FIG. 7 that the inner clamping band 39 has an upper ring portion 39' similar to the outer clamping band 38 which serves to clamp the one flange 36 of the eye-end 34 to the upper leaf 32 and a lower ring portion 39" in which the lower leaf 33 has freedom of movement longitudinally and vertically. The lower ring portion 39" has an integral bottom member 44 in which are holes 45 to enable the screws 41 in the inner clamping band 39 to be tightened.

The lower leaf 33 has a wear plate 46, for example of polyamide, pinned to the upper surface of its end portion. A rubbing plate 47, for example of medium carbon steel, is secured (for example by adhesive) to the undersurface of the upper leaf 32 for rubbing engagement with the wear plate 46. Alternatively the rubbing plate 47 could be extended to enable it to be clamped to the upper leaf 32 by the two clamping bands 38, 39 and secured by the screws 41 securing the clamping bands.

The lower ring portion 39" of the inner band 39 which guides and supports the lower leaf 33 may alternatively comprise, as shown in FIG. 8, side walls 48 and a removable closing member 49 across the bottom formed by a length of tube 50 secured between the side walls 48 by a through bolt 51, extending through holes in the side walls, and a releasing nut 52. Such a construction facilitates assembly of the lower leaf to the upper leaf.

Considering the assembly of FIG. 6 in use with the composite spring 31 fitted with similar eye-ends 34 at each end and, for example, a vehicle axle secured to the spring between its ends, it will be realised that if a transverse fracture of the upper leaf 32 were to occur the axle would still remain located. The lower leaf 33 below the fracture of the upper leaf 32 would still have its ends guided and supported in the lower ring portions 39" of the inner clamping bands 39 at the eye-ends 34, the inner clamping bands remaining secured to the vehicle by the respective eye-ends.

Spring leaves of composite fibre reinforced synthetic resin material are known which have relatively deep sections at the central portions of their lengths and taper to shallower sections at their ends. In FIG. 9 of the accompanying drawings a leaf spring assembly in accordance with the invention is shown which includes such a spring leaf. The assembly is generally similar to that of the first-described embodiment illustrated by FIGS. 1 and 2 and corresponding parts are indicated by the reference numerals used with respect to that embodiment. An eye-end 5 of the assembly is secured to the tapered end portion 2 of the spring leaf 1 at its flanges 7, 8 by clamping bands 12, 13 of endless ring form with machined inner faces retained to the flanges and leaf by pins 14', 15'. As before, the flanges and clamping bands have engaging complementary inclined surfaces. The lower surface 9 of the eye-end 5 seats flush on the top surface of the spring leaf. To compensate for the taper of the spring leaf towards its end, a wedge-shaped filling piece 53 is inserted in the clamping bands against the bottom surface of the leaf. Thus the clamping bands 12, 13 act between the inclined upper surfaces of the flanges 7, 8 and the under surface 54 of the filling piece 53. The taper of the filling piece is such that with its upper surface lying flush against the bottom surface of the leaf its under surface 54 lies parallel to the top surface of the leaf. As an alternative, the filling piece may have an under surface which, as indicated by broken lines in FIG. 9, has mutually inclined portions 55, 56 which extend to its opposite ends such that the filling piece tapers towards both of its ends. In the applied position of the filling piece, as shown, the inclined portions 55, 56 slope from the medial portion of the filling piece towards the inclined surfaces of the respective flanges 7, 8 of the eye-end. Preferably the included angles between the inclined portions 55, 56 and the inclined surfaces of the respective flanges 7, 8 are 4° to 6° and are shared between the flanges and the filling piece. With either form of the filling piece a depending extension 11 of the one flange 8 is extended sufficiently to locate the filling piece as well as the eye-end 5 relative to the spring leaf.

In the embodiments described the clamping bands used to clamp the attachment members have been described as being machined on their inner surfaces. It will be understood, however, that the clamping bands may be made as precision forgings or castings to obviate machining.

Whilst it is preferred that the clamping bands and the flanges of the eye-ends of the assemblies of FIGS. 1 and 2, 6 and 9 have mutually engaging inclined surfaces, it will be appreciated that clamping may be effected with non-inclined surfaces.

If desired, the security of the assemblies may be enhanced by the use of an adhesive, for example an epoxy adhesive, having a resin system compatible with that of the spring leaves, to cement the lower surfaces 9 of the eye-ends to the spring leaves 1 in the embodiments of FIGS. 1 and 2, 6 and 9, and the tang 24 in the recess of the spring leaf 16 in the embodiment of FIGS. 3 to 5.

I claim:

1. A leaf spring assembly comprising a spring leaf of composite fibre reinforced synthetic resin material having opposed upper and lower substantially planar surfaces at an end portion thereof, an attachment member comprising an eye-end having an eye carried between two oppositely-directed extension portions of flange form having ends remote from said eye, and a flat surface in flush contact with one of said planar surfaces of said spring leaf at said end portion and extending longitudinally of said spring leaf, said extension portions having inclined surfaces facing away from said flat surface and converging towards said flat surface towards said ends of said extension portions, and two endless clamping bands fitted about said end portion and said respective extension portions, one clamping band on each side of said eye and having an inclined surface which is complementary to said inclined surface of said extension portion with which it engages, said clamping bands acting respectively between said inclined surfaces and the other of said planar surfaces of said spring leaf whereby said extension portions and said end portion are clamped together in intimate engagement.

2. A leaf spring assembly as claimed in claim 1 in which said planar surfaces at said end portion converge towards its extremity, said eye-end is located on said upper planar surface, a tapered filling piece has an inclined upper surface which is engaged with said lower planar surface opposite said eye-end and a lower surface which lies substantially parallel to said planar surface, and each said clamping band acts between said inclined surface of said extension portion with which said clamping band engages and said lower surface of said filling space.

3. In combination a leaf spring assembly as claimed in claim 1 in which said eye-end is located on said upper planar surface of said spring leaf and a second spring leaf of composite fibre reinforced synthetic resin material is disposed co-extensively below said spring leaf, and in which one of said clamping bands remote from the extremity of said end portion of said spring leaf has depending walls between which said second spring leaf is slidably received, and retaining means is provided between said depending walls which retains said second spring leaf between said depending walls with freedom to move towards and away from said leaf spring over a limited distance.

4. A leaf spring assembly as claimed in claim 1 in which said attachment member has an abutment surface and said end portion of said spring leaf has an extremity with which said abutment surface engages and locates said attachment member relative to said spring leaf.

5. A leaf spring assembly as claimed in claim 1 including securing members passed through said clamping band, said extension portion and said spring leaf.

* * * * *